United States Patent
Honma et al.

(10) Patent No.: US 6,441,069 B1
(45) Date of Patent: Aug. 27, 2002

(54) FLAME-RETARDANT RESIN COMPOSITION AND MOLDING PRODUCT FORMED OF THE SAME

(75) Inventors: Masato Honma, Ehime; Akiyoshi Tamai; Shinichi Tamura, both of Aichi, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/568,164

(22) Filed: May 9, 2000

(30) Foreign Application Priority Data

May 28, 1999 (JP) .......................... H11-150201

(51) Int. Cl.[7] .............. C08J 5/10; C08K 5/51; C08L 25/04
(52) U.S. Cl. ................ 524/127; 524/128; 524/506
(58) Field of Search ................. 524/127, 128, 524/506

(56) References Cited

U.S. PATENT DOCUMENTS 5,837,384 A * 11/1998 Funaki et al. ............... 428/521
6,124,394 A * 9/2000 Goto et al. .................. 524/495

FOREIGN PATENT DOCUMENTS

GB 0 413 972 2/1991
GB 0 732 359 9/1996

OTHER PUBLICATIONS

Database WPI; Section CH, Week 199522 Derwent Publications, Ltd., London, GB Class A13, AN 1995-167361 Abstract Only.

* cited by examiner

Primary Examiner—James J. Seidleck
Assistant Examiner—U. K Rajguru
(74) Attorney, Agent, or Firm—Schnader Harrison Segal & Lewis LLP

(57) ABSTRACT

A flame-retardant resin composition comprising (A) 100 parts by weight of a styrenic resin, (B) 1 to 30 parts by weight of a phosphate ester compound and (C) 0.1 to 10 parts by weight of a phosphate ester compound having a specific structure, and amolding product formed of the same impart a high flame retardance to the styrenic resin without using an organic halogen compound, and are also excellent in mechanical properties, impact resistance and moldability.

7 Claims, No Drawings

FLAME-RETARDANT RESIN COMPOSITION AND MOLDING PRODUCT FORMED OF THE SAME

BACKGROUND OF THE INVENTION

1. Field of the Invention

The present invention relates to a styrenic resin composition and a molding product formed of the same. More specifically, it relates to a flame-retardant styrenic resin composition having a high flame retardance without using an organic halogen compound and excellent in mechanical properties, impact resistance and moldability, and a molding product formed of the same.

2. Description of the Related Art

Styrenic resins typified by rubber-reinforced styrenic resins are excellent in mechanical properties, moldability and electric insulation properties, and therefore find wide acceptance in various fields of parts of home electric appliances, office automation equipment and automobiles.

However, since styrenic resins are inherently flammable, various techniques of imparting a flame retardance have been so far proposed in view of safety.

As a technique of imparting a flame retardance to styrenic resins, a method in which a halogen-based flame retarder having a high efficiency of a flame retardance, such as abromine compound, and antimony oxide are incorporated into a resin to impart a frame retardance has been generally employed. A flame-retardant resin composition obtained by this method involves, however, a problem of a large fuming amount in combustion.

Thus, in order to overcome the defect of the halogen-based flame retarder, a completely halogen-free flame-retardant resin has been in high demand in recent years.

As a halogen-free flame retarder, there is a phosphorus-based flame retarder, and a phosphate ester has been so far used well as a typical one. For example, a method in which a polyphosphate is added to a styrenic resin (Japanese Patent Laid-Open No. 24,736/1984), a method in which a phosphate ester having a specific structure is added to a rubber-reinforced styrene (Japanese Patent Laid-Open No. 140,270/1999) and a method in which a liquid phosphate ester is added to a styrenic resin (Japanese Patent Laid-Open No. 5,869/1999) have been already disclosed.

However, since styrenic resins are extremely flammable, the effect of imparting a flame retardance is quite low with a phosphate ester. In the compositions obtained by the methods described in Japanese Patent Laid-Open Nos. 24,736/1984, 140,270/1999 and 5,869/1999, a large amount of a phosphate ester has to be added to styrenic resins for imparting the flame retardance thereto. Consequently, not only are mechanical properties decreased, but also there are problems that a phosphate ester is bled out, contamination of a mold occurs in the molding and a gas is generated in the molding.

In order to solve these problems, a method of using a hydroxyl group-having phosphate ester is disclosed in Japanese Patent Laid-Open No. 247,315/1993.

Nevertheless, the hydroxyl group-having phosphate ester has also quite a low effect of imparting a flame retardance. Thus, it has been difficult to solve the problems.

Since an effect of imparting a flame retardance is low with a phosphate ester, it was found that the flame retardance is improved by using melamine cyanurate as a flame-retardant aid in addition to a phosphate ester. However, this could not solve the problem that mechanical properties, an impact resistance and a moldability inherent in styrenic resins are impaired.

Besides, a method in which a phenolic novolak resin and further a compound having a triazine structure are added as a char layer forming polymer to a hydroxyl group-having phosphate ester for improving a flame retardance is disclosed in Japanese Patent Laid-Open No. 70,448/1995.

This technique cannot solve either the problem that mechanical properties, an impact resistance and a moldability inherent in styrenic resins are impaired. Moreover, since a phenolic resin is a material having quite a poor light resistance, there is a problem that a light resistance of the resulting resin composition is decreased.

A method in which red phosphorus having a high effect of imparting a flame retardance is used as a halogen-free flame retarder and a phenolic resin having a char layer formability is added as a flame-retardant aid is disclosed in Japanese Patent Laid-Open No. 157,866/1994.

Although a flame retardance can be imparted by this technique, mechanical properties, an impact resistance and a moldability inherent in styrenic resins are impaired. In addition, there is a problem that a molding product is colored in red phosphorus tint owing to red phosphorus.

Meanwhile, as a technique of using a phosphite ester having a similar structure to a phosphate ester, a method in which a halogen-based retarder and a phosphate ester are added to a styrenic resin for improving a heat stability (Japanese Patent Laid-Open No. 80,159/1974), a method in which a phosphite ester is added to ABS having a high content of acrylonitrile which tends to yellow for preventing coloration (Japanese Patent Laid-Open No. 94,548/1979), a method in which a phosphite ester having a molecular weight of 1,500 or more is added to modified PPE and a styrenic alloy for preventing coloration (Japanese Patent Laid-Open No. 174,439/1983) and a method in which a specific halogen-having compound and a phosphite ester are added to a styrenic resin for improving a heat stability (Japanese Patent Laid-Open No. 88,050/1992) have been already proposed. These techniques are, however, for improving a heat stability or preventing coloration and not for imparting a flame retardance.

When a phosphite ester was used as a flame retarder in a styrenic resin, a property of preventing coloration or a heat stability of a resin composition was indeed improved, but a flame retardance was rather decreased by incorporating the same into a flammable styrenic resin. Even though it was used in a large amount, a flame retardance was hardly imparted.

SUMMARY OF THE INVENTION

The invention aims to provide a flame-retardant resin composition having a high flame retardance and excellent in mechanical properties, impact resistance and moldability.

The construction of the invention is as follows.

A flame-retardant resin composition of the invention comprises (A) 100 parts by weight of a styrenic resin, (B) 1 to 30 parts by weight of one or more of phosphate ester compounds represented by the following formula (1), and (C) 0.1 to 10 parts by weight of one or more of phosphate ester compounds having a structure represented by the following formula (2) and having a long-chain alkyl group having 9 or more continuous carbon atoms in a molecule,

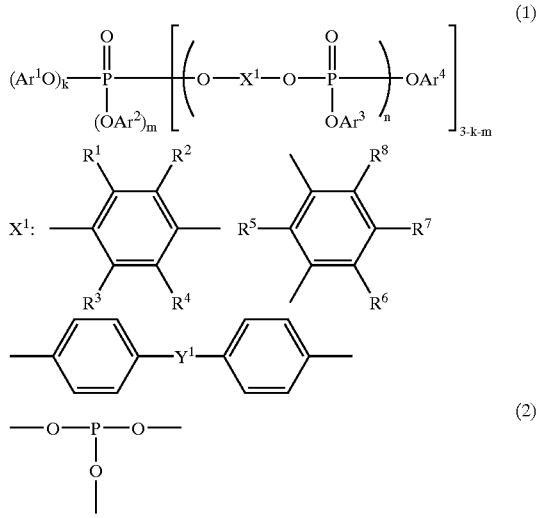

wherein
$R^1$ to $R^8$, which may be the same or different, each represent a hydrogen atom or an alkyl group having 1 to 5 carbon atoms, $Y^1$ represents a direct bond, O, S, $SO_2$, $C(CH_3)_2$, $CH_2$ or CHPh in which Ph represents a phenyl group, $Ar^1$ to $Ar^4$, which may be the same or different, each represent a phenyl group or a phenyl group substituted with a halogen-free organic residue, n is an integer of at least 0, and k and m are each an integer of at least 0 and at most 2, provided k+m is at least 0 and at most 2.

Further, a molding product of the invention is formed by molding the flame-retardant resin composition.

DESCRIPTION OF THE PREFERRED EMBODIMENTS

The flame-retardant resin composition and the molding product formed of the same in the invention are specifically described below.

The styrenic resin (A) used in the invention is a polymer polymerizing a monomer or a monomer mixture containing an aromatic vinyl monomer as a main constituting component. Examples of this aromatic vinyl monomer include styrene, α-methylstyrene, p-methylstyrene, vinyl toluene, tert-butylstyrene and o-ethylstyrene. Especially, styrene and α-methylstyrene are preferably used. These may be used either singly or in combination.

For imparting properties such as a chemical resistance and a heat resistance to the styrenic resin, another vinyl monomer copolymerizable with the aromatic vinyl monomer may be copolymerized. Examples of another vinyl monomer include acrylonitrile, methacrylonitrile, ethacrylonitrile, (meth)acrylic acid, methyl (meth)acrylate, ethyl (meth)acrylate, n-propyl (meth)acrylate, n-butyl (meth)acrylate, tert-butyl (meth)acrylate, n-hexyl (meth)acrylate, glycidyl (meth)acrylate, glycidyl itaconate, allylglycidyl ether, styrene-p-glycidyl ether, p-glycidylstyrene, 2-hydroxyethyl (meth)acrylate, 3-hydroxypropyl (meth)acrylate, 3-hydroxypropyl (meth)acrylate, 2,3,4,5,6-pentahydroxyhexyl (meth)acrylate, 2,3,4,5,6-pentahydroxyhexyl (meth)acrylate, 2,3,4,5-tetrahydroxypentyl acrylate, maleic acid, maleic anhydride, monoethylmaleate, itaconic acid, itaconic anhydride, phthalic acid, N-methylmaleimide, N-ethylmaleimide, N-cyclohexylmaleimide, N-phenylmaleimide, acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methacrylamine, N-methylallylamine, p-aminostyrene, 2-isopropenyloxazoline, 2-vinyloxazoline, 2-acroyloxazoline and 2-styryloxazoline. Especially, acrylonitrile is preferably used.

In the styrenic resin (A), the copolymerization ratio of the aromatic vinyl monomer, the main constituting component, is between 50 and 99% by weight, preferably between 60 and 90% by weight in view of a balance of properties of the resin composition, such as a moldability and a chemical resistance. When a vinyl cyanide monomer is used as a copolymerizable component, the copolymerization ratio of this copolymerizable component is between 1 and 50% by weight, preferably between 10 and 40% by weight. Further, the copolymerization ratio of another vinyl monomer copolymerizable therewith can be in the range of 50% by weight or less.

With respect to the styrenic resin (A), it is advisable that an intrinsic viscosity measured at 30° C. in a methyl ethyl ketone solvent is between 0.3 and 0.7 dl/g, preferably between 0.4 and 0.6 dl/g and an intrinsic viscosity measured at 30° C. in an N,N-dimethylformamide solvent is between 0.3 and 0.8 dl/g, preferably between 0.4 and 0.7 dl/g because a resin composition which is excellent in impact resistance and moldability is obtained.

A method for producing the styrenic resin (A) is not particularly limited, and an ordinary method such as a bulk polymerization method, a suspension polymerization method, an emulsion polymerization method, a bulk-suspension polymerization method or a solution-bulk polymerization method can be used.

Further, in order to greatly improve properties of the styrenic resin, such as an impact resistance, it is advisable to use a rubber-modified styrenic resin in which a rubbery polymer is dispersed in a matrix made of the aromatic vinyl polymer.

Examples of the rubbery polymer include diene rubbers such as polybutadiene, a styrene-butadiene copolymer, an acrylonitrile-butadiene copolymer, a styrene-butadiene block copolymer and a butyl acrylate-butadiene copolymer, acrylic rubbers such as polybutyl acrylate, polyisoprene and an ethylene-propylene-diene terpolymer. Of these, polybutadiene and butadiene copolymers are preferably used.

A weight average particle diameter of rubber particles of the rubbery polymer is preferably between 0.15 and 0.6 μm, more preferably between 0.2 and 0.55 μm in view of an impact resistance. The average weight particle diameter of the rubber particles can be measured by the sodium alginate method described in Rubber Age, vol. 88, pp. 484 to 490, (1960), by E. Schmidt, P. H. Biddison, in which by using the fact that there is a difference in a particle diameter of polybutadiene to be creamed depending on a concentration of sodium alginate, a particle diameter of a cumulative weight fraction of 50% is calculated from a weight ratio of a creamed product and a cumulative weight fraction of a sodium alginate concentration.

The rubbery polymer is incompatible with the styrenic resin as the matrix. Accordingly, when a component compatible with the matrix is grafted on the rubbery polymer, the impact resistance can be all the more improved. That is, it is preferable to use a graft polymer obtained by graft-polymerizing an aromatic vinyl monomer or the monomer mixture in the presence of the rubbery polymer. With respect to the monomer used in the graft polymerization, the same component as in the aromatic vinyl polymer being the matrix is preferably used in the same amount, and the composition and the graft amount are not particularly limited. It is advisable to adjust the composition and the graft amount so as not to impair the dispersibility of the rubbery polymer.

Specifically, a method in which a graft polymer (a) obtained by graft-polymerizing a rubbery polymer with a monomer or a monomer mixture containing the a monomer and a styrenic polymer (b) obtained by polymerizing a rubbery polymer with a monomer or a monomer mixture containing the aromatic vinyl monomer are melt-kneaded to produce a rubber-reinforced styrenic resin is preferably used industrially and economically.

With respect to the amounts of the rubbery polymer and the monomer or the monomer mixture in obtaining the graft polymer (a), it is advisable that the rubbery polymer is between 10 and 80% by weight, preferably between 20 and 70% by weight. When the amount of the rubbery polymer is less than 10% by weight, the impact resistance of the resin composition is decreased. When it exceeds 80% by weight, the impact resistance of the resin composition and the appearance of the molding product are sometimes impaired.

The graft polymer (a) can be obtained by a known polymerization method such as emulsion polymerization or bulk polymerization. A method in which a mixture comprising a monomer or a monomer mixture, a radical initiator and a chain transfer agent is continuously fed to a polymerization vessel in the presence of a rubbery polymer latex to conduct emulsion polymerization is preferable in view of the operation.

During the polymerization of the graft polymer (a), the monomer or the monomer mixture is polymerized as the graft component, while an ungrafted polymer is generated at the same time. With respect to the properties of the ungrafted polymer, it is preferable that an intrinsic viscosity measured at 30° C. in a methyl ethyl ketone solvent is between 0.20 and 0.60 dl/g and an intrinsic viscosity measured at 30° C. in an N,N-dimethylformamide solvent is between 0.25 and 0.75 dl/g because a resin composition excellent in impact resistance and surface appearance is obtained.

The styrenic polymer (b) can be produced in the same manner as the styrenic resin (A).

When the rubber-reinforced styrenic resin used in the invention is obtained by melt-kneading the graft polymer (a) and the styrenic polymer (b) such that the content of the rubbery polymer is 10% by weight or more, the impact resistance can satisfactorily be increased. Thus, it is preferable.

Specific examples of the rubber-modified styrenic resin include impact-resistant polystyrene, an ABS resin, a transparent ABS resin, an AAS resin (acrylonitrile-acrylic rubber-styrene copolymer) and an AES resin (acrylonitrile-ethylene propylene rubber-styrene copolymer).

As the styrenic resin (A), the resins obtained by the foregoing method may be used either singly or in combination.

The phosphate ester compounds (B) used as the fire retarder in the invention are represented by formula (1).

First, the structure of the phosphate ester compounds represented by formula (1) is described.

In formula (1), n is an integer of at least 0, and k and m are each an integer of at least 0 and at most 2, provided k+m is at least 0 and at most 2. Preferably, k and m are each an integer of at least 0 and at most 1. More preferably, k and m are each 1.

In formula (1), $R^1$ to $R^8$, which may be the same or different, each represent a hydrogen atom or an alkyl group having 1 to 5 carbon atoms. Specific examples of the alkyl group having 1 to 5 carbon atoms include methyl, ethyl, n-propyl, isopropyl, n-butyl, sec-butyl, tert-butyl, n-isopropyl, neopentyl, tert-pentyl, 2-isopropyl, 3-isopropyl and neoisopropyl groups. A hydrogen atom and methyl and ethyl groups are preferable, and a hydrogen atom is more preferable.

$Y^1$ represents a direct bond, O , S, $SO_2$, $C(CH_3)_2$, $CH_2$ or CHPh in which Ph represents a phenyl group.

$Ar^1$ to $Ar^4$, which may be the same or different, each represents a phenyl group or a phenyl group substituted with a halogen-free organic residue. Specific examples thereof include phenyl, tolyl, xylyl, cumenyl, mesityl, naphthyl, indenyl and anthryl groups. Phenyl, tolyl, xylyl, cumenyl and naphthyl groups are preferable, and phenyl, tolyl and xylyl groups are more preferable.

The amount of the phosphate ester compound (B) represented by formula (1) is between 1 and 30 parts by weight, preferably 2 to 25 parts by weight, more preferably between 3 and 20 parts by weight, especially preferably between 5 and 15 parts by weight per 100 parts by weight of the styrenic resin (A).

When the amount of the phosphate ester compound (B) is less than 1 part by weight, no satisfactory flame retardance is provided. When it exceeds 30 parts by weight, it cannot sometimes be melt-kneaded with the styrenic resin (A). Further, mechanical properties or a heat resistance of a molding product is sometimes impaired. Thus, it is unwanted.

The phosphate ester compounds (B) represented by formula (1) may be used either singly or in combination.

The phosphate ester compound (C) used as another flame retarder in the invention has the structure represented by formula (2) and has the long-chain alkyl group having 9 or more continuous carbon atoms in the molecule.

In the phosphate ester compound (C), a phosphate ester compound represented by the following formula (3) or (4) is preferable in view of the flame retardance, the impact resistance and the moldability, and a phosphate ester compound represented by the following formula (4) is more preferable.

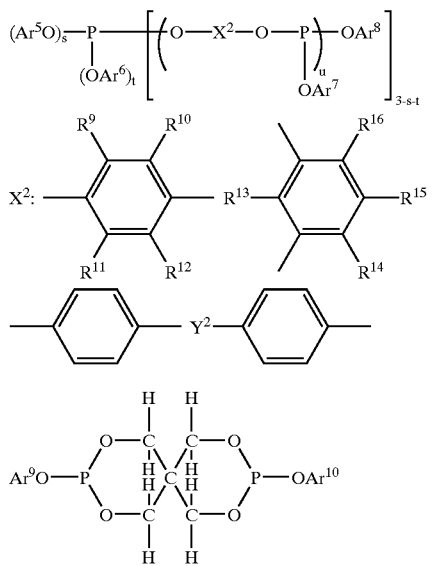

The phosphite ester compound represented by formula (3) or (4) is described below.

In formula (3), u is an integer of at least 0. Further, s and t are each an integer of at least 0 and at most 2, provided s+t is at least 0 and at most 2.

Further, in formula (3), $R^1$ to $R^{16}$, which may be the same or different, each represents a hydro gen atom or an alkyl group having to 5 carbon atoms. Specific examples of the alkyl group having 1 to 5 carbon atoms include methyl, ethyl, n-propyl, isopropyl, n-butyl, sec-butyl, tert-butyl, n-isopropyl, tert-pentyl, 2-isopropyl, neopentyl and 3-isopropyl groups.

$Y^2$ represents a direct bond, O , S, $SO_2$, $C(CH_3)_2$, $CH_2$ or CHPh in which Ph represents a phenyl group.

$Ar^5$ to $Ar^8$ and $Ar^9$ and $Ar^{10}$, which may be the same or different, each represents an alkyl group, a phenyl group, or an alkyl group or phenyl group substituted with a halogen-free organic residue. At least one, preferably one or more of $Ar^5$ to $Ar^9$ and at least one, preferably one or both of $Ar^9$ and $Ar^{10}$ have a long-chain alkyl group or a long-chain alkyl group substituted with a halogen-free organic residue. In this case, the number of continuous carbon atoms of the long-chain alkyl group or the substituted long-chain alkyl group is 9 or more, preferably 13 or more, more preferably 18 or more. When the long-chain alkyl group or the substituted long-chain alkyl group is absent, the flame retardance, the impact resistance and the moldability of the invention are not enhanced, but sometimes the flame retardance is rather decreased. Thus, it is unwanted.

Specific examples of $Ar^5$ to $Ar^8$ and $Ar^9$ and $Ar^{10}$. include methyl, ethyl, n-propyl, isopropyl, n-butyl, sec-butyl, tert-butyl, n-isopropyl, neopentyl, tert-pentyl, 2-isopropyl, 3-isopropyl, octyl, nonyl, decyl, tridecyl, octadecyl, 2-methyloctyl, 2,2-dimethyloctyl, 4-methyl-5-ethyloctyl, 2-nonyl-2-butenyl, phenyl, tolyl, xylyl, cumenyl, mesityl, 2,4-di-tert-butylphenyl, 2,6-di-tert-butylphenyl, naphthyl, indenyl, anthryl, nonylphenyl, tridecylphenyl, octadecylphenyl and 2-nonyl-2-butenylphenyl groups. At least one of $Ar^5$ to $Ar^8$ and at least one of $Ar^9$ and $Ar^{10}$ have a long-chain alkyl group and a substituted long-chain alkyl group such as octyl, nonyl, decyl, tridecyl, octadecyl, 2-methyloctyl, 2,2-dimethyloctyl, 4-methyl-5-ethyloctyl, 2-nonyl-2-butenyl, nonylphenyl, tridecylphenyl and octadecylphenyl groups. Especially, tridecyl, octadecyl, nonylphenyl, tridecylphenyl and octadecylphenyl groups are preferable.

The amount of the phosphite ester compound (C) having the structure represented by formula (2) is between 0.1 and 10 parts by weight, preferably between 0.3 and 5 parts by weight, more preferably between 0.5 and 3 parts by weight per 100 parts by weight of the styrenic resin (A).

When the amount of the phosphate ester compound (C) is less than 0.1 part by weight, the flame retardance, the impact resistance and the moldability are not improved satisfactorily. When it exceeds 10 parts by weight, the flame retardance is sometimes rather decreased. Thus, it is unwanted.

The phosphite ester compounds (C) may be used either singly or in combination.

In the invention, for further increasing the flame retardance and the impact resistance, it is advisable to use a silicone rubber and/or a silicone resin (D). The silicone rubber and/or the silicone resin (D) here referred to is a polyorganosiloxane resinous polymer or copolymer made of chemically bound siloxane units selected from units represented by the following formulas (5) to (8) and mixtures thereof.

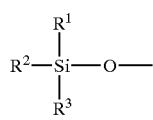

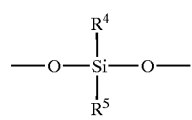

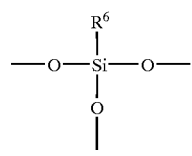

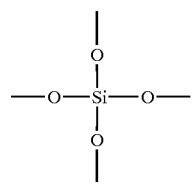

wherein R represents a group selected from a saturated or unsaturated monovalent hydrocarbon group, a hydrogen atom, a hydroxyl group, an alkoxyl group, an aryl group, a vinyl group and an allyl group.

Such a polyorganosiloxane resinous polymer or copolymer can further have a reactive functional group in the molecule or in the end of the molecule. Examples of the reactive functional group include epoxy, acryloxy, methacryloxy, vinyl, phenyl and N-β-(N-vinylbenzylamino)ethyl-γ-aminoalkyl hydrochloride groups.

The silicone rubber and/or the silicone resin (D) may be mixed with a silica filler. The silicone rubber and the silica filler can be mixed by a known method. Still further, the composition comprising the silicone rubber and the silica filler can contain an alkoxysilane coupling agent.

As the silane coupling agent, a silane coupling agent having at least one alkoxy group having 1 to 4 carbon atoms in a molecule and any of epoxy, acryloxy, methacryloxy, vinyl, phenyl, N-β-(N-vinylbenzylamino)ethyl-γ-aminoalkyl hydrochloride and hydroxy groups is available. Among others, a silane coupling agent having any of epoxy, acryloxy and methacryloxy groups can preferably be used.

The amount of the silicone rubber and/or the silicone resin (D) is between 0.1 and 3 parts by weight, preferably between 0.3 and 2 parts by weight, more preferably between 0.5 and 1 part by weight per 100 parts by weight of the styrenic resin. The use of the same in this range can further increase the flame retardance.

The silicone rubbers and/or silicone resins (D) may be used either singly or in combination.

Moreover, in the invention, it is advisable to use a phenolic antioxidant (E). This is because a higher flame retardance can be maintained by a synergistic effect with the phosphite ester compound (C).

The phenolic antioxidant (E) here is not particularly limited, and one or more of known compounds can be used as required.

The amount of the phenolic antioxidant (E) is between 0.1 and 3 parts by weight, preferably between 0.2 and 1 part by weight, more preferably between 0.3 and 0.5 part by weight per 100 parts by weight of the styrenic resin (A).

The flame-retardant resin composition of the invention can further contain, as required, at least one of ordinary additives, for example, inorganic fillers such as glass fibers, glass powders, glass beads, glass flakes, alumina, alumina fibers, carbon fibers, graphite fibers, stainless steel fibers, whiskers, potassium titanate fibers, wollastonite, asbestos, hard clay, calcinedclay, talc, kaolin, mica, calciumcarbonate, magnesium carbonate, aluminum oxide and minerals; hindered phenol-based, benzotriazole-based, benzophenone-based, benzoate-based and cyanoacrylate-based ultraviolet absorbers and lubricants; higher fatty acid-based, acid ester-based, acid amide-based and higher alcohol-based lubricants and plasticizers; release agents such as montanic acid and salts, esters and hard esters thereof, stearyl alcohol, stella amide and ethylene wax; coloration preventing agents such as phosphite salts and hypophosphite salts; nucleating agents; amine-based, sulfonic acid-based and polyether-based antistatic agents; and colorants such as carbon black and pigments.

The flame-retardant resin composition of the invention is produced by a known method. For example, it is produced by preliminarily mixing the styrenic resin (A), the phosphate ester compound (B), the phosphate ester compound (C) and other additives, or separately feeding the same to an extruder, and thoroughly melt-kneading the mixture at a temperature of 150 to 300° C. In this instance, for example, a monoaxial, diaxial or triaxial extruder having a "unimelt"-type screw and a kneader can be used. Especially, it is preferable to use a few kneading elements in a screw in inserted or non-inserted state for controlling an aspect ratio.

The flame-retardant resin composition of the invention is excellent in not only the flame retardance but also the mechanical properties, the impact resistance and the moldability, and is melt-moldable. Accordingly, it can be extrusion-molded, injection-molded and press-molded. Thus, it can be molded into films, tubes, rods and products having any desired shape and size.

The molded products formed of the flame-retardant resin composition of the invention can find wide acceptance in electric and electronic parts, automobile parts, mechanical mechanism parts, housings of office automation equipment and home electric appliances and parts thereof.

Specific examples of the molding products formed of the flame-retardant resin composition in the invention include various gears, various cases, electric and electronic parts such as sensors, LEP lamps, connectors, sockets, resistors, relay cases, switches, coil bobbins, condensers, variable condenser cases, optical pickups, oscillators, terminal strips, transformers, plugs, printed wiring boards, tuners, speakers, microphones, headphones, small motors, magnetic head bases, power modules, housings, semiconductors, liquid crystals, FDD carriages, FDD chassis, motor brush holders, parabola antennas and computer parts, parts of home and office electric appliances typified by VTR parts, television set parts, irons, hair dryers, rice cooker parts, electronic oven parts, sound unit parts such as audio parts and audio laser disc compact disc, illumination parts, refrigerator parts, air conditioner parts, typewriter parts and word processor parts, office computer parts, telephone set parts, facsimile parts, copier parts, washing units, bearings such as oilless bearings, stern bearings and submerged bearings, machine parts typified by motor parts, lighters and typewriters, parts of optical instrument and precision instrument typified by microscopes, binoculars, cameras and clocks, alternator terminals, alternator connectors, IC regulators, valves such as exhaust gas valves, fuel, exhaust and intake pipes, air intake nozzle snorkels, intake manifolds, fuel pumps, engine cooling water joints, carburetor main bodies, carburetor spacers, exhaust gas sensors, cooling water sensors, oil temperature sensors, brake pat wear sensors, throttle position sensors, crank shaft position sensors, air flow meters, air conditioner thermostat bases, heating hot water flow control valves, brush holders for radiator motor, water pump impellers, turbine vanes, wipermotor parts, distributors, starter switches, starter relays, transmission wire harnesses, window washer nozzles, air conditioner panel switch substrates, fuel solenoid valve coils, fuse connectors, horn terminals, insulation plates of electric parts, step motor rotors, lamp sockets, lamp reflectors, lamp housings, brake pistons, solenoid bobbins, engine oil filters and igniter cases. It is quite useful in these fields.

EXAMPLES

The construction and the effects of the invention are described more specifically by referring to the following Examples. Parts in these Examples are all on the weight basis.

Methods for measuring properties are as follows.

(1) Flame Retardance

With respect to test pieces for evaluating a flame retardance, which were obtained by injection molding at amolding temperature of 230° C. and a mold temperature of 60° C. using an injection molding machine IS55EPN manufactured by Toshiba Machine Co., Ltd., the flame retardance was evaluated according to the evaluation standard prescribed in UL94. The level of the flame retardance is decreased in the order of V-0>V-1 >V-2>HB. In case of the evaluation of V-2 or higher, a total of burning times of five samples was used as an index of the flame retardance. Further, in the evaluation of V-2, a case in which there is one test piece that has a level of V-2 but is burned to a clamp in a set of five test pieces was indicated by the mark *. Since a total burning time became excessively long in this case, it was not described.

(2) Limiting Oxygen Index (LOI)

The limiting oxygen index (LOI) was measured according to a limiting oxygen index method: JIS K 7201. The higher the LOI value, the better the flame retardance. When LOI is not lower than 22, it is judged that a product has a self-extinguishing property.

(3) Mechanical Properties

With respect to test pieces (notched) ¼ inch in thickness obtained by injection molding at a molding temperature of 230° C. and a mold temperature of 60° C. using an injection molding machine, IS55EPN manufactured by Toshiba Machine Co., Ltd., the flexural modulus and the flexure stress were measured according to ASTM D-790.

(4) Impact Properties

With respect to test pieces ¼ inch in thickness obtained by injection molding at a molding temperature of 230° C. and a mold temperature of 60° C. using an injection molding machine, IS55EPN manufactured by Toshiba Machine Co., Ltd., the izod impact strength was measured according to ASTM D-256.

(5) Fluidity

The resin pellets obtained were dried at 70° C. for 3 hours, and measured for MFR (melt flow rate) at 200° C. and 5 kg according to ISO-R1133. The higher the value, the higher the fluidity, and the moldability is excellent.

Reference Example 1

The styrenic resins (A-1) to (A-3) used in the invention are as follows.

Graft Copolymer (a)

A method for producing a graft copolymer is described below. A graft ratio was obtained in the following manner.

Acetone was added to a predetermined amount (m) of a graft copolymer, and the solution was refluxed for 4 hours. This solution was centrifuged at 8,000 rpm [centrifugal force 10,000 G (approximately $100 \times 10^3$ m/s$^2$)]for 30 minutes, and an insoluble matter was then filtered. This insoluble matter was vacuum-dried at 70° C. for 5 hours, and the amount (n) was measured. The graft ratio was calculated using the following formula.

Graft ratio=$[(n)-(m) \times L]/[(m) \times L] \times 100$ wherein L is a rubber content of a graft copolymer.

Forty parts of a monomer mixture comprising 70% of styrene and 30% of acrylonitrile was added in the presence of 50 parts (as a solid content) of a polybutadiene latex (average rubber particle diameter 0.3 μm, gel content 85%) for emulsion polymerization, and one part by weight, per 100 parts by weight of the solid-content, of a phenolic antioxidant was added to complete the polymerization. The resulting graft copolymer was solidified with sulfuric acid, neutralized with sodiumhydroxide, washed, filtered, and dried to produce a powdery graft copolymer (a). The graft ratio of the resulting graft copolymer was 42%.

Styrenic Resin (b)

A monomer mixture comprising 70 parts by weight of styrene and 30 parts by weight of acrylonitrile was suspension-polymerized in a polymerization vessel fitted with a stirrer to produce a styrenic resin (b). The resulting bead polymer was thoroughly dried, and then dissolved in methyl ethyl ketone. An intrinsic viscosity of the resulting product was measured in a constant-temperature bath of 300° C., and it was found to be 0.45 dl/g.

A-1:

The above-formed styrenic resin (b) was solely used.

A-2:

A mixture of 20 parts by weight of the above-formed graft polymer (a) and 80 parts by weight of the above-formed styrenic resin (b) was used. The content of the rubbery polymer in the styrenic resin was 10% by weight.

A-3:

A mixture of 40 parts by weight of the above-formed graft polymer (a) and 60 parts by weight of the above-formed styrenic resin (b) was used. The content of the rubbery polymer in the styrenic resin was 20% by weight.

Reference Example 2

The phosphate ester compounds (B) used in the invention are as follows.

B-1:

"PX-200", an aromatic diphosphate made by Daihachi Kagaku

B-1:

"CR-733S", a polyphosphate made by Daihachi Kagaku

Reference Example 3

Phosphite ester compounds (C) used in the invention are as follows.

C-1:

"ADEKA STAB PEP-8", distearylpentaerythritol diphosphite (number of continuous carbon atoms of an alkyl group—18) made by Asahi Denka Kogyo K. K.

C-2:

"SUMILYZER TNP", trisnonylphenyl phosphite (number of continuous carbon atoms of an alkyl group—9) made by Sumitomo Chemical Co., Ltd.

C-3:

"ADEKA STAB PEP-36", bis(2,6-di-tert-butyl-4-methylphenyl)pentaeryth ritol diphosphite (number of continuous carbon atoms of an alkyl group—2) made by Asahi Denka Kogyo K.K.

C-4:

"ADEKASTAB 2112", tris(2,4-di-tert-butylphenyl) phosphate (number of continuous carbon atoms of an alkyl group—2) made by Asahi Denka Kogyo K.K.

Reference Example 4

The silicone rubber and/or the silicone resin (D) used in the invention is as follows.

D-1:

"DC4-7081", a silicone rubber powder made by Toray Dow Corning Silicone: this silicone rubber has a methacrylic group as a reactive functional group.

D-2:

"TOSPEARL 2000B", a silicone resin made by Toshiba Silicone

Reference Example 5

The phenolic antioxidant (E) used in the invention is as follows.

E:

"SUMILYZER GM", made by Sumitomo Chemical Co., Ltd.

Examples 1 to 10 and Comparative Examples 1 to 9

Components in mixing amounts shown in Table 1 were fed at a time from a hopper port of a unidirectional rotary diaxial extruder(PCM-30, manufactured by Ikegai Iron Works, Ltd.) having a screw diameter of 30 mm and L/D of 25, and melt-extruded at a resin temperature of 220° C. and a screw rotational speed of 150 rpm. The resulting pellets were dried at 70° C. for 3 hours, and injection-molded to obtain desired test pieces. The evaluation results are also shown in Table 1.

TABLE 1

| | Resin composition | | | | | Properties of resin composition | | | | | | | |
|---|---|---|---|---|---|---|---|---|---|---|---|---|---|
| | (A) | (B) Phosphate ester | (C) Phosphite ester | (D) Silicone | (E) Phenolic | Flame retardance (UL94) | | Limiting oxygen | Flexural | Flexure | Izod impact strength | | Fluidity |
| | Styrenic resin | compound | compound | compound | compound | 3.2 mm | 1.6 mm | index | modulus | stress | 12.7 mm | 3.2 mm | (MFR) |
| | parts by weight | parts by weight | parts by weight | parts by weight | parts by weight | – (sec) | – (sec) | (LOI) | GPa | Mpa | J/m | J/m | g/10 min |
| Example | | | | | | | | | | | | | |
| 1 | A-1:100 | B-1:10 | C-1:1 | D-1:1 | — | V-2(86) | V-2(23) | 25 | 3.50 | 89 | 37 | 42 | 14.3 |
| 2 | A-2:100 | B-1:10 | C-1:1 | D-1:1 | — | V-2(112) | V-2(29) | 25 | 2.88 | 73 | 120 | 198 | 9.4 |
| 3 | A-3:100 | B-1:10 | C-1:1 | D-1:1 | — | V-2(125) | V-2(–)* | 24 | 2.19 | 53 | 195 | 266 | 5.7 |
| 4 | A:2:100 | B-1:7 B-2:3 | C:1:1 | D-1:1 | — | V-2(108) | V-2(26) | 25 | 2.86 | 71 | 118 | 186 | 9.6 |
| 5 | A-2:100 | B-2:10 | C-1:1 | D-1:1 | — | V-2(119) | V-2(33) | 24 | 2.84 | 70 | 117 | 182 | 9.8 |
| 6 | A-2:100 | B-1:10 | C-1:0.5 C-2:0.5 | D-1:1 | — | V-2(115) | V-2(30) | 23 | 2.88 | 74 | 116 | 190 | 9.2 |
| 7 | A-2:100 | B-1:10 | C-2:1 | D-1:1 | — | V-2(120) | V-2(36) | 23 | 2.89 | 73 | 108 | 176 | 8.8 |
| 8 | A-2:100 | B-1:10 | C-1:1 | D-2:1 | — | V-2(124) | V-2(33) | 25 | 2.89 | 75 | 103 | 177 | 9.5 |
| 9 | A-2:100 | B-1:10 | C-1:1 | — | — | V-2(138) | V-2(–)* | 24 | 2.89 | 74 | 102 | 170 | 9.5 |
| 10 | A-3:100 | B-1:10 | C-1:1 | D-1:1 | 1 | V-2(120) | V-2(32) | 26 | 2.18 | 52 | 191 | 265 | 5.8 |
| Comparative Example | | | | | | | | | | | | | |
| 1 | A-1:100 | B-1:10 | — | — | — | HB(–) | HB(–) | 20 | 3.50 | 88 | 34 | 36 | 13.8 |
| 2 | A-2:100 | B-1:10 | — | — | — | HB(–) | HB(–) | 21 | 2.89 | 73 | 85 | 119 | 8.7 |
| 3 | A-2:100 | B-1:10 | — | D-1:1 | — | HB(–) | HB(–) | 21 | 2.86 | 71 | 91 | 129 | 8.4 |
| 4 | A-2:100 | B-1:10 | C-1:20 | D-1:1 | — | V-2(128) | HB(–) | 22 | 2.81 | 68 | 76 | 105 | 9.8 |
| 5 | A-2:100 | B-1:40 | C-1:1 | D-1:1 | — | — | — | — | — | — | — | — | — |
| 6 | A-2:100 | B-1:10 | C-3:1 | D-1:1 | — | V-2(–)* | HB(–) | 21 | 2.86 | 72 | 101 | 165 | 8.2 |
| 7 | A-2:100 | B-1:10 | C-4:1 | D-1:1 | — | HB(–) | HB(–) | 21 | 2.89 | 73 | 105 | 172 | 8.1 |
| 8 | A-2:100 | — | C-1:10 | — | — | HB(–) | HB(–) | 20 | 2.89 | 73 | 85 | 118 | 8.6 |
| 9 | A-2:100 | — | C-1:10 | D-1:1 | — | HB(–) | HB(–) | 20 | 2.88 | 72 | 87 | 119 | 8.7 |

Note:
The mark * indicates that the flame retardance is V-2 but there is one test piece, in a set of five test pieces, that is burned to a clamp.

Examples and Comparatives in Table 1 reveal the following.

The composition comprising the styrenic resin (A), the phosphate ester compound (B) and the phosphate ester compound (C) in each of Examples 1 to 10 provides the flame retardance of V-2 or more according to UL94. Further, the limiting oxygen index is in the range of 23 to 25, showing the self-extinguishing property (LOI>22). Meanwhile, when the phosphate ester compound (C) is absent as in Comparative Examples 1 to 3 or the phosphite ester compound (1) is free of the long-chain alkyl group as in Comparative Examples 6 and 7, no flame retardance (V-2 level) is observed. This tendency is especially strong in the test piece having the thickness of 1.6 mm. Further, the limiting oxygen index is a level of 20 to 22, showing that the self-extinguishing property is poor. Still further, when an excessive amount of the phosphate ester compound (B) is used as in Comparative Example 5, the compounding is impossible under the conditions of the invention.

Furthermore, when the phosphate ester compound (C) is used in an amount which is more than required, as in Comparative Example 4, the flame retardance is rather decreased, and LOI is also decreased. Moreover, even when the phosphate ester compound alone is incorporated as in Comparative Example 8, the flame retardance and the self-extinguishing property are not provided at all. Even when the silicone resin is incorporated in the phosphate ester compound as in Comparative Example 9, the flame retardance and the self-extinguishing property are not provided.

Comparison of Examples 1 to 3 shows that by incorporating the rubbery polymer into the styrenic resin (A), the impact strength can greatly be improved while maintaining V-2. However, the product having the high content of the rubbery polymer tends to decrease the flame retardance and the moldability. In this case, the slight effect of improvement can be expected with the combined use of the phenolic antioxidant as is clear upon comparing Examples 3 and 10.

As is clear from Examples 2, 4 and 5, the effects of the invention are observed even with the use of two types of the phosphate ester compounds (B).

As is clear from Examples 2, 6 and 7, the effects of the invention are observed even with the use of two types of the phosphate ester compounds (C). Further, the compound having the long-chain alkyl group is advantageous in view of the flame retardance, the impact resistance and the moldability.

Upon comparing Examples 2, 8 and 9, the flame retardance is no doubt improved with the use of the silicone rubber and/or the silicone resin.

What is claimed is:

1. A flame-retardant resin composition comprising (A) 100 parts by weight of a styrenic resin, (B) 1 to 30 parts by weight of one or more of phosphate ester compounds represented by the following formula (1), and (C) 0.1 to 10 parts by weight of one or more of phosphite ester compounds having a structure represented by the following formula (2) and having a long-chain alkyl group having 9 or more continuous carbon atoms in a molecule,

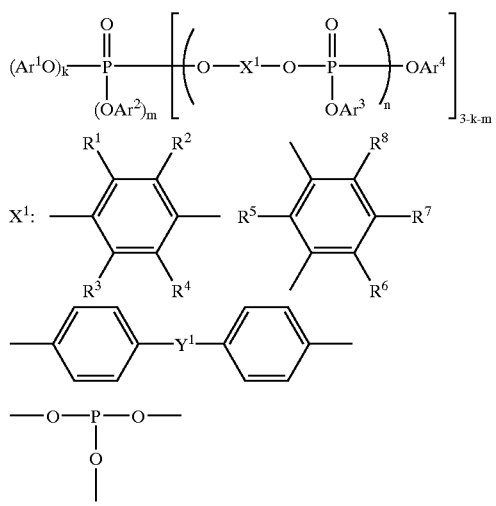

wherein
$R^1$ to $R^8$, which may be the same or different, each represents a hydrogen atom or an alkyl group having 1 to 5 carbon atoms,
$Y^1$ represents a direct bond, O, S, $SO_2$, $C(CH_3)_2$, $CH_2$ or CHPh. in which Ph represents a phenyl group,
$Ar^1$ to $Ar^4$, which may be the same or different, each represents a phenyl group or a phenyl group substituted with a halogen-free organic residue,
n is an integer of at least 0, and
k and m are each an integer of at least 0 and at most 2, provided k+m is at least 0 and at most 2.

2. The flame-retardant resin composition as claimed in claim 1, wherein the phosphite ester compounds (C) represented by formula (2) are phosphate ester compounds represented by formula (3) or (4)

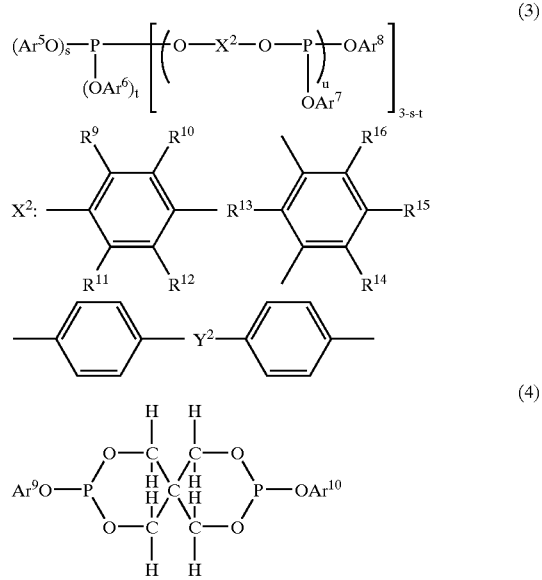

wherein
$R^9$ to $R^{16}$ which may be the same or different, each represents a hydrogen atom or an alkyl group having 1 to 5 carbon atoms,
$Y^2$ represents a direct bond, O, S, $S_2$, $C(CH_3)_2$, $CH_2$ or CHPh. $Ar^5$ to $Ar^8$ and $Ar^9$ and $Ar^{10}$, which may be the same or different, each represents an alkyl group, a phenyl group, or an alkyl group or phenyl group substituted with or a halogen-free organic residue, at least one of $Ar^5$ to $Ar^8$ has a long-chain alkyl group having 13 or more continuous carbon atoms, and at least one of $Ar^9$ and $Ar^{10}$ has a long-chain alkyl group having 9 or more continuous carbon atoms,
u is an integer of at least 0, and s and t are each an integer of at least 0 and at most 2, provided s+t is at least 0 and at most 2.

3. The flame-retardant resin composition as claimed in claim 1, wherein the phosphite ester compounds (C) represented by formula (2) are phosphate ester compounds represented by formula (4)

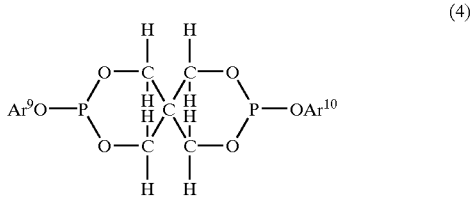

wherein
$Ar^9$ and $Ar^{10}$, which may be the same or different, each represents an alkyl group, a phenyl group, or an alkyl group or phenyl group substituted with a halogen-free organic residue, and at least one of $Ar^9$ and $Ar^{10}$ has a long-chain alkyl group having 9 or more continuous carbon atoms, u is an integer of at least 0, and s and t are each an integer of at least 0 and at most 2, provided s+t is at least 0 and at most 2.

4. The flame-retardant resin composition as claimed in any one of claims 1 to 3, wherein the styrenic resin (A) is a rubber-reinforced styrenic resin.

5. The flame-retardant resin composition as claimed in any one of claims 1 to 3, which further comprises (D) 0.1 to 3 parts by weight of a silicone rubber and/or a silicone resin.

6. The flame-retardant resin composition as claimed in any one of claims 1 to 3, which further comprises 0.1 to 3 parts by weight of a phenolic antioxidant (E).

7. A molding product which is formed of the flame-retardant resin composition as claimed in any one of claims 1 to 3.

\* \* \* \* \*